(12) United States Patent
Crawford

(10) Patent No.: US 12,181,571 B2
(45) Date of Patent: Dec. 31, 2024

(54) ALTIMETER TESTING DEVICE AND METHODS

(71) Applicant: VIAVI SOLUTIONS INC., Chandler, AZ (US)

(72) Inventor: Rock Crawford, Chandler, AZ (US)

(73) Assignee: VIAVI SOLUTIONS Inc., Chandler, AZ (US)

( * ) Notice: Subject to any disclaimer, the term of this patent is extended or adjusted under 35 U.S.C. 154(b) by 62 days.

(21) Appl. No.: 17/818,088

(22) Filed: Aug. 8, 2022

(65) Prior Publication Data
US 2023/0111612 A1 Apr. 13, 2023

Related U.S. Application Data

(63) Continuation of application No. 16/789,012, filed on Feb. 12, 2020, now Pat. No. 11,408,992.

(51) Int. Cl.
G01S 13/88 (2006.01)
G01S 7/40 (2006.01)
H04W 24/06 (2009.01)

(52) U.S. Cl.
CPC .......... G01S 13/882 (2013.01); G01S 7/4052 (2013.01); *G01S 7/4065* (2021.05); *H04W 24/06* (2013.01)

(58) Field of Classification Search
CPC .... G01S 13/882; G01S 7/4052; G01S 7/4065; H04W 24/06
See application file for complete search history.

(56) References Cited

U.S. PATENT DOCUMENTS

| | | | |
|---|---|---|---|
| 5,047,782 | A | 9/1991 | Lew et al. |
| 5,160,933 | A | 11/1992 | Hager |
| 5,177,488 | A | 1/1993 | Wang et al. |
| 5,300,934 | A | 4/1994 | Asbell et al. |
| 5,442,360 | A | 8/1995 | Maignan et al. |
| 2004/0178949 | A1 | 9/2004 | Brettner, III et al. |
| 2008/0238763 | A1 | 10/2008 | Burlet et al. |
| 2009/0058716 | A1 | 3/2009 | Thomas et al. |
| 2009/0238763 | A1 | 9/2009 | Yu et al. |
| 2015/0145715 | A1 | 5/2015 | Lim et al. |
| 2019/0204414 | A1 | 7/2019 | Steinmetz |

(Continued)

FOREIGN PATENT DOCUMENTS

| | | |
|---|---|---|
| CN | 102565768 B | 4/2014 |
| CN | 110987020 | 4/2020 |
| JP | 10-20020 | 1/1998 |

(Continued)

OTHER PUBLICATIONS

Partial English Abstract for CN 110987020 published Apr. 4, 2020.
(Continued)

*Primary Examiner* — Timothy X Pham
(74) *Attorney, Agent, or Firm* — DLA Piper LLP (US)

(57) ABSTRACT

Devices and methods for testing altimeters are provided. A radio-frequency (RF) signal may be received from an altimeter and passed through an RF delay module to delay the RF signal. The delayed RF signal may be converted to an optical signal, which may be passed through an optical delay module to delay the optical signal. The system tests the accuracy of the altimeter based on the combined RF signal delay and optical signal delay.

20 Claims, 4 Drawing Sheets

(56) References Cited

U.S. PATENT DOCUMENTS

2019/0253701 A1    8/2019  Hime et al.
2020/0333434 A1*  10/2020  Chancey .................. G09B 9/54

FOREIGN PATENT DOCUMENTS

| JP | 2011-242199 | 12/2011 |
| JP | 5-508228 | 5/2015 |
| JP | 6-507028 | 4/2019 |
| KR | 100971766 | 7/2010 |

OTHER PUBLICATIONS

Partial English Abstract for KR 100971766 published Jul. 21, 2010.
Written Opinion cited in PCT/US21/17024 dated Nov. 4, 2021.
International Search Report cited in PCT/US21/17024 dated Nov. 4, 2021.
Extended European Search Report for Application No. 21774479.6, dated Nov. 24, 2023, 8 Pages.
International Preliminary Report on Patentability for International Application No. PCT/US2021/017024, mailed Aug. 25, 2022, 7 Pages.
Lee J-H., "Development of an FMCW Radar Altimeter Simulator Using Optical Delay Lines," The Journal of Korean Institute of Electromagnetic Engineering and Science, vol. 28, No. 3, Mar. 1, 2017, pp. 208-216.
Partial English Abstract for JP 2011-242199 published Dec. 1, 2011.
Partial English Abstract for JP 10-20020 published Jan. 23, 1998.
Japanese Office Action cited in JP 2022-547297 dated Sep. 10, 2024.

\* cited by examiner

ALTIMETER TESTING DEVICE AND METHODS

CROSS-REFERENCE TO RELATED APPLICATION

This application is a Continuation application of U.S. application Ser. No. 16/789,012, filed Feb. 12, 2020, the entire disclosure of which is incorporated by reference herein.

TECHNICAL FIELD

The present disclosure relates to altimeters and, more particularly, to a device and method for testing the accuracy of altimeters.

BACKGROUND

Radio altimeters are generally used in aircraft to determine an altitude of the aircraft. FIG. 1 illustrates an exemplary radio altimeter 10 having a processor 12 and a memory 14. The memory 14 includes instructions that, when executed by the processor 12, cause a transmission antenna 16 to transmit a signal 18 to the ground 20. The transmitted signal 18 is reflected off the ground 20 and a return signal 22 is detected by a receiving antenna 24. The altimeter 10 includes a clock 26 that records a delay between the transmission of the signal 18 and the reception of the return signal 22. The processor 12 utilizes this delay to determine an altitude of the aircraft based on the signal traveling at the speed of light.

Generally, altimeters are tested using synthesized delay responses to a transmission signal. That is, while the altimeter (and subsequently the aircraft) is on the ground, a testing device simulates a delayed signal to the altimeter. Unfortunately, these testing devices are signal waveform dependent and are not operable on all altimeters. As such, not all testing devices provide traceable measurements. A need remains for an altimeter testing device with a physical delay that is waveform agnostic.

SUMMARY

The present disclosure includes one or more of the features recited in the appended claims and/or the following features which, alone or in any combination, may comprise patentable subject matter.

In one embodiment, a method of testing an altimeter is provided. The method being performed by a test device and comprising: inputting a test altitude; receiving a radio-frequency (RF) signal from the altimeter; passing the received RF signal through at least one delay module to delay the RF signal by a delay corresponding to the test altitude; and transmitting the delayed RF signal to the altimeter.

In another embodiment, a device for testing an altimeter is provided. The device comprises: an input device to input a test altitude; an input to receive a radio-frequency (RF) signal from the altimeter; at least one delay module to delay the RF signal by a delay corresponding to the test altitude; and an output for transmitting the delayed RF signal to the altimeter.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION OF THE DRAWINGS

Figure 1:
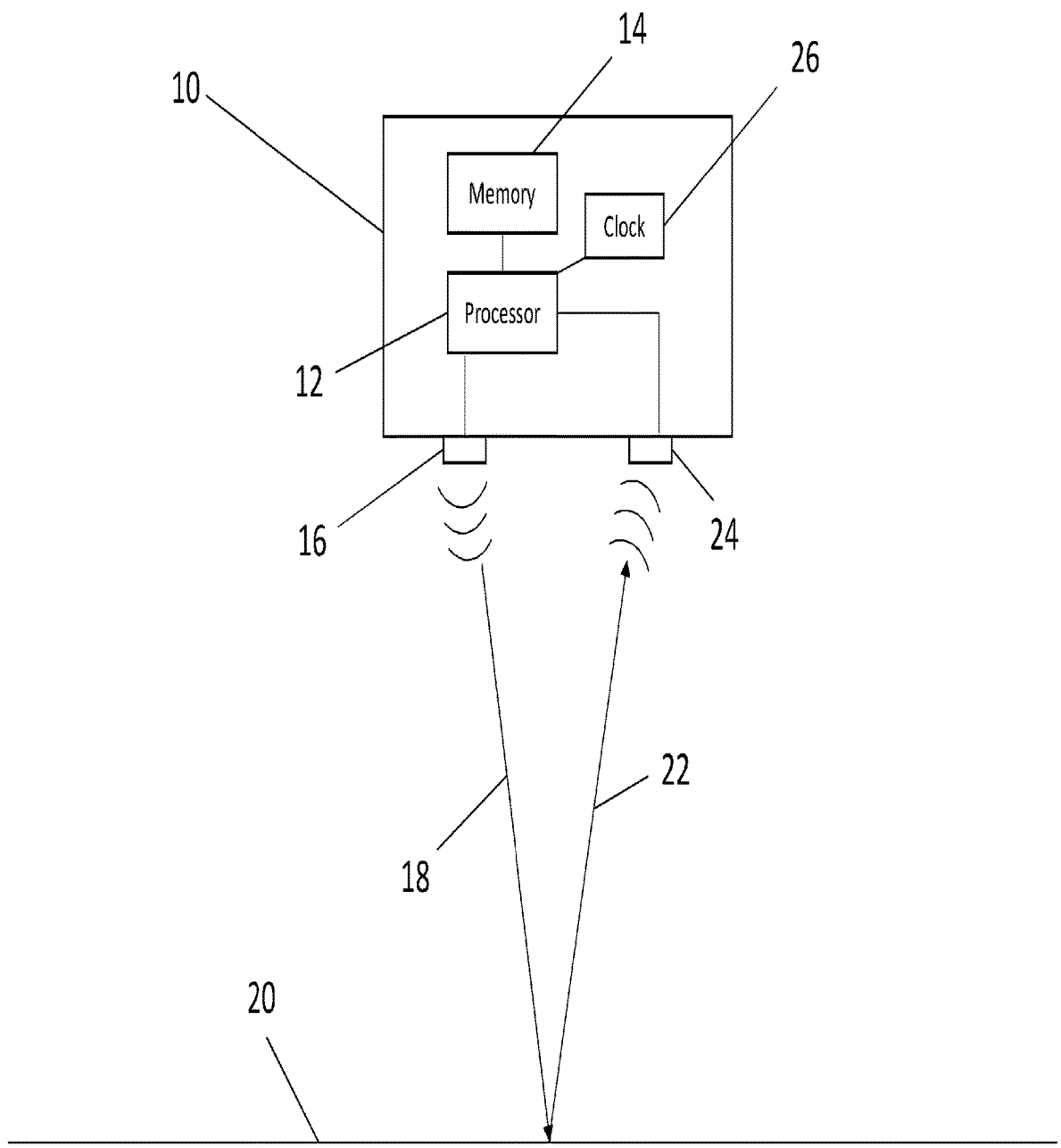
FIG. 1 is a schematic diagram of a prior art altimeter transmitting a signal to ground and receiving a return signal.

While the concepts of the present disclosure are susceptible to various modifications and alternative forms, specific embodiments thereof have been shown by way of example in the figures and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 2:
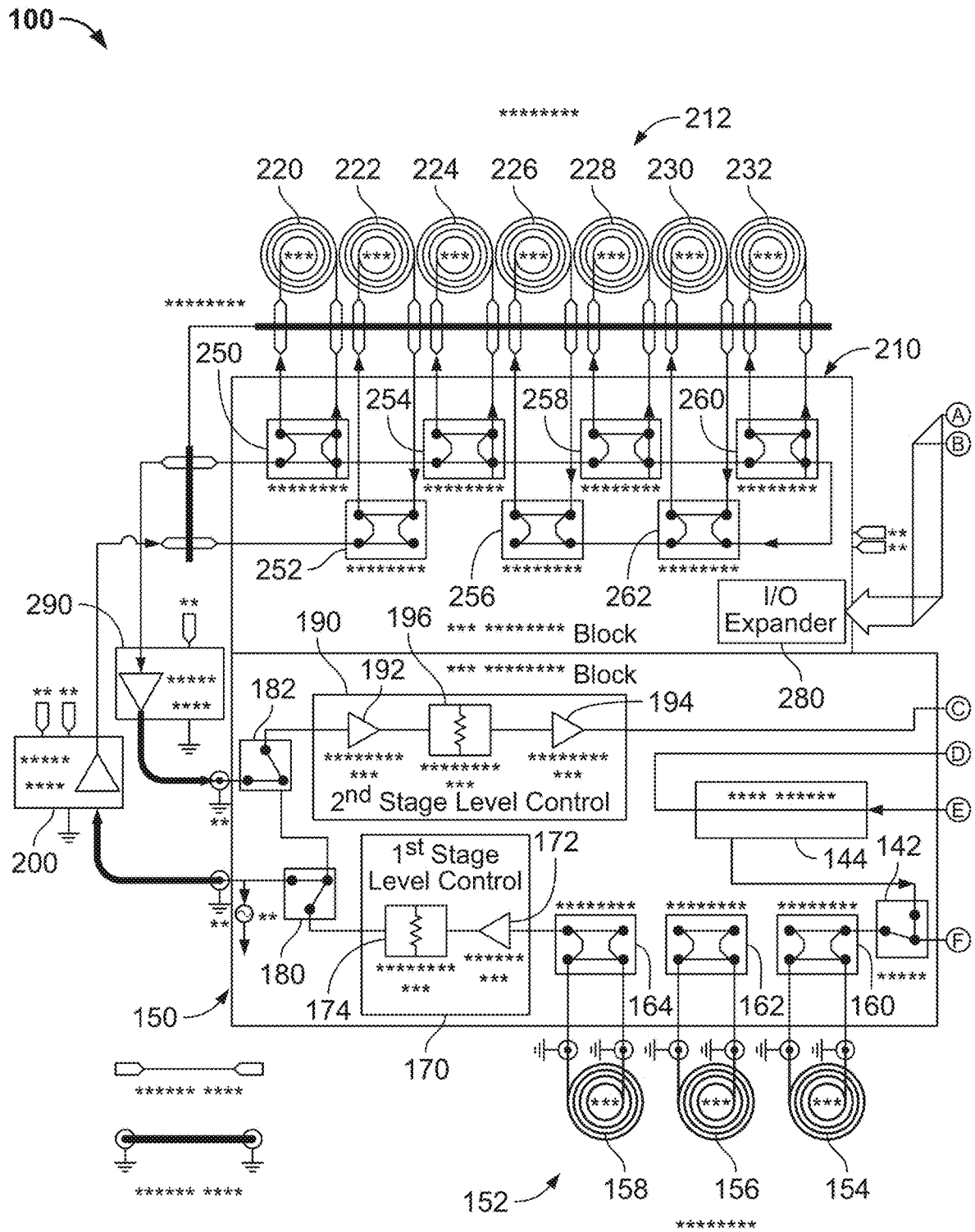
FIG. 2 is a schematic diagram of an example altimeter testing device having an RF delay module in series with an optical delay module constructed in accordance with the disclosed principles.
Figure 2:
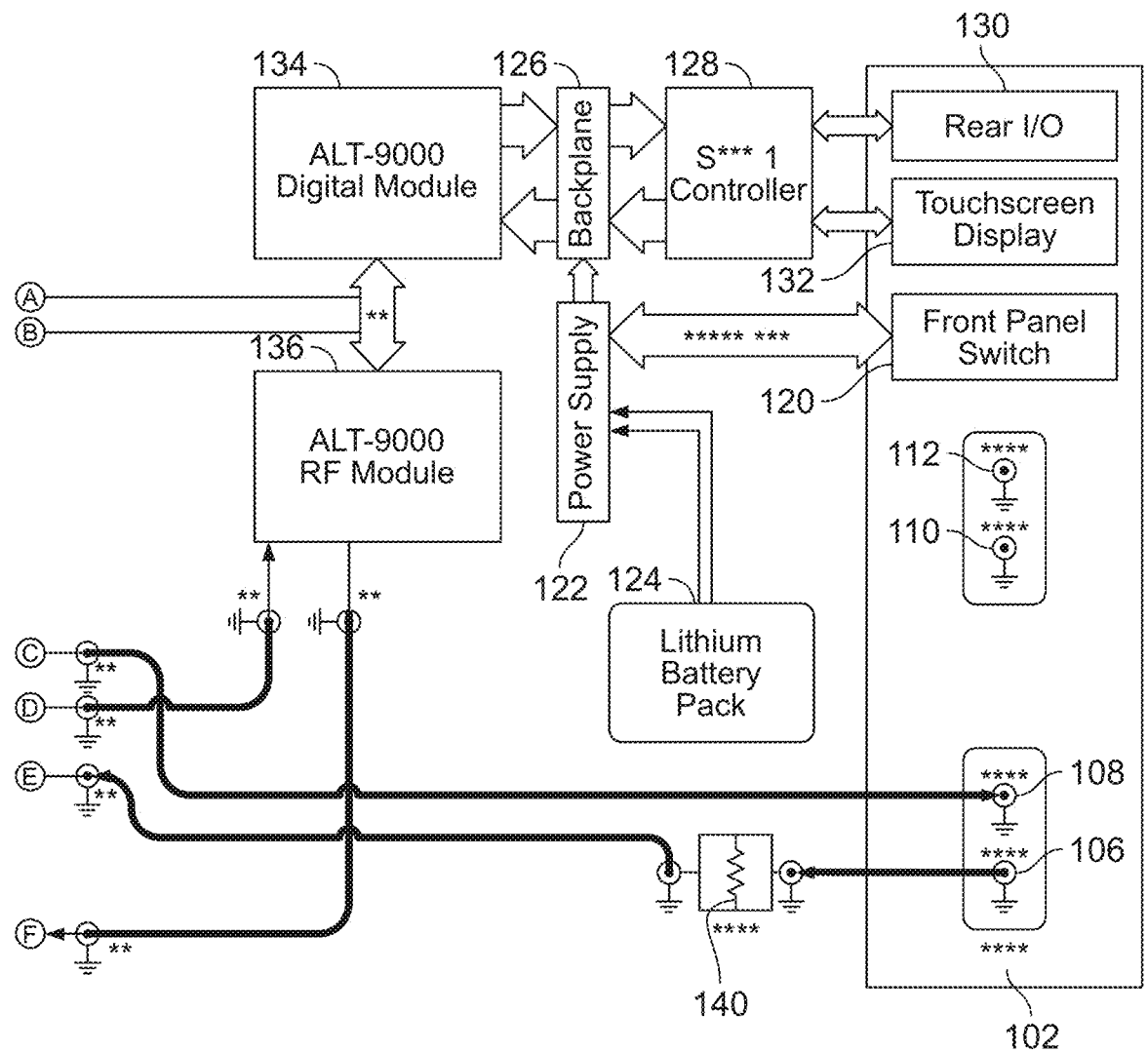

Referring to FIG. 2, an example altimeter testing device 100 in accordance with the disclosed principles may include a control panel 102 having an antenna input 106 and an antenna output 108. The antenna input 106 may be configured to couple to the transmission antenna 16 of the altimeter 10 illustrated in FIG. 1 to receive the transmitted signal 18 from the altimeter 10. The output 108 may be configured to couple to the receiving antenna 24 of the altimeter 10 illustrated in FIG. 1 to output a return signal from the testing device 100 to the altimeter 10. The testing device 100 may be configured to simulate a predetermined altitude of a signal transmitted from the altimeter. For example, the testing device 100 may be set to simulate an altitude of 1000 feet as discussed in more detail below. During the test, the altimeter 10 transmits a signal 18 to the testing device 100. The testing device 100 may pass the signal 18 through a predetermined amount of cable that correlates to/simulates an altitude of 1000 feet (e.g., 2000 feet of cable) and transmits a return signal 22 to the altimeter 10. If the altimeter 10 is functioning properly, the altimeter 10 will detect an altitude of 1000 feet based on the delay between the transmission of the signal 18 and the reception of the return signal 22, with the delay being caused by the signal passing through predetermined amount of cable that correlates to/simulates an altitude of 1000 feet (e.g., 2000 feet of cable). Notably, the testing device 100 performs several conversions of the signal 18, as described in more detail below. Additionally, the testing device 100 may test any predetermined altitude between 10 feet and 10,230 feet in increments of 10, as described in more detail below.

The control panel 102 may include two ports 110, 112 that are configured to perform voltage standing wave ratio (VSWR) testing, which is a separate function from the altimeter accuracy test described herein. For example, VSWR testing may be used to determine cable loss and or the impedance of coaxial cables and antennas used in the radio altimeter system.

A switch 120 may be provided on the control panel 102 to turn the testing device 100 on and off. The switch 120 is coupled to a power supply 122 that powers the testing device 100. In the illustrative embodiment, the power supply 122 is powered by a battery pack 124 such as e.g., a lithium ion battery. In another embodiment, the power supply 122 may include a plug to retrieve power from an outlet in the aircraft or an outlet independent of the aircraft. The power supply 122 powers a backplane circuit board 126 that is coupled to a controller 128. The controller 128 includes a processor (not shown), memory (not shown), and other necessary components to carry out instructions that may be used to operate the testing device 100. In the illustrated embodiment, the controller 128 is coupled to a rear input/output (I/O) module 130 and a touchscreen display 132 that enable a user to operate the testing device 100. For example, the touchscreen display 132 may include inputs (not shown) that enable the user to select a predetermined altitude to test and to initiate the test. As will be appreciated, the touchscreen display 132 may include other inputs and display features that enable the user to operate the testing device 100. The backplane circuit board 126 may also be coupled to a digital module 134 and a radio-frequency (RF) module 136 (via a ribbon connection to the digital module 134). The modules 134 and 136 may carryout instructions from the controller 128 to modify and alter RF signals and digital signals described herein.

In operation, the antenna input 106 passes the transmitted signal 18 through an attenuator 140, which may reduce the power of the signal 18 without appreciably distorting the waveform of the signal 18. The signal 18, with reduced power, is transmitted to an RF delay module 150 to delay the RF signal in accordance with the disclosed principles. In the RF delay module 150, the signal may be routed through a bi-directional coupler 144. A switch 142 may be opened or closed to select either the RF module 136 for calibration, or the altimeter 10 to run the altimeter test. The RF signal may then be passed to a plurality of coaxial cable coils 152 designed to correlates to/simulate various altitudes, and their resultant delays, when switched into the signal's path. In the illustrated example, the coaxial cable coils 152 include a first coil 154 correlating to/simulating an altitude of 10 feet, a second coil 156 correlating to/simulating an altitude of 20 feet, and a third coil 158 correlating to/simulating an altitude of 40 feet. The first coil 154 is coupled to a first switch 160, the second coil 156 is coupled to a second switch 162, and the third coil is coupled to a third switch 164. In one embodiment, the length of the cable can be described by the following equation, referred to herein as "Equation (1)":

$$\text{Length} = 2 * h * v \qquad (1)$$

Where h is the simulated height (i.e., altitude) and v is the velocity factor of the medium (e.g., coaxial cable). It is known that the velocity factor for an RF cable and a fiber optic cable (discussed below) are similar at approximately 0.68.

In operation of the illustrated device 100, the controller 128 opens and closes the switches 160, 162, and 164 (via the RF module 136) based on the predetermined altitude being tested (e.g., as set by the user via the touchscreen display 132). For example, if the predetermined altitude requires that the signal pass through 50 feet of cable, the first switch 160 and third switch 164 are closed by the controller 128 to pass the signal through the first coil 154 and the third coil 158 to delay the signal over 50 feet. In some embodiments, all of the switches 160, 162, 164 are opened and the signal is passed through the RF delay module 150 without being delayed.

In operation, the RF signal is then processed in a first stage level control 170 that in the illustrated example includes an amplifier 172 and an attenuator 174, which may be used to simulate the path loss of the RF signal in free space at the simulated altitude. If the RF signal is fully delayed, for example if the signal is delayed by a predetermined altitude of 50 feet, a pair of switches 180 and 182 are set to a position to route the signal to a second stage level control 190. The second stage level control 190 may include a pair of amplifiers 192, 194 and an attenuator 196 between the amplifiers 192, 194, which also may be used to simulate the path loss of the RF signal in free space at the simulated altitude. The signal is then output through the antenna output 108 to the altimeter 10 to determine whether the altimeter 10 measures 50 feet. Although the RF delay module 150 is described with respect to delaying the signal a predetermined altitude of 50 feet, it will be appreciated that the RF delay module 150 may delay the signal to any altitude between 10 feet and 70 feet in increments of 10 feet based on the settings of the switches 160, 162, 164.

If the predetermined altitude requires a delay of 80 feet or greater (e.g., as set by the user via the touchscreen display 132), switch 180 is set to a position to route the signal to a laser diode 200. Switch 182 is set to a position to connect the input of the second stage level control 190 to an output of a photodiode 290 (discussed below). The laser diode 200 converts the RF signal to an optical signal, which is transmitted to an optical delay module 210 by the laser diode 200. The optical delay module 210 includes a plurality of fiber optic coils 212 designed to correlate to/simulate various altitudes, and their resultant delays, when switched into the optical signal's path. In the illustrated embodiment, the coils 212 include a first coil 220 correlating to/simulating an altitude of 80 feet, a second coil 222 correlating to/simulating an altitude of 160 feet, a third coil 224 correlating to/simulating an altitude of 320 feet, a fourth coil 226 correlating to/simulating an altitude of 640 feet, a fifth coil 228 correlating to/simulating an altitude of 1280 feet, a sixth coil 230 correlating to/simulating an altitude of 2560 feet, and a seventh coil 232 correlating to/simulating an altitude of 5120 feet. In one embodiment, the length of the fiber optic coils may be determined using Equation (1) described above.

A first fiber optic switch 250 is coupled to the first coil 220, a second fiber optic switch 252 is coupled to the second coil 222, a third fiber optic switch 254 is coupled to the third coil 224, a fourth fiber optic switch 256 is coupled to the fourth coil 226, a fifth fiber optic switch 258 is coupled to the fifth coil 228, a sixth fiber optic switch 262 is coupled to the sixth coil 230, and a seventh fiber optic switch 260 is coupled to the seventh coil 232.

In operation, the controller 128 may selectively open and close the fiber optic switches 250, 252, 254, 256, 258, 260, 262 (via the digital module 134, which is connected to the optical delay module 210 at an input/output expander 280) based on the predetermined altitude being tested (e.g., as set by the user via the touchscreen display 132). For example, if the predetermined altitude being tested is 880 feet, the controller 128 closes the first fiber optic switch 250 to pass the optical signal through a simulated 80 feet of altitude/delay, closes the second fiber optic switch 252 to pass the optical signal through an additional simulated 160 feet of altitude/delay, and closes the fourth fiber optic switch 256 to pass the optic signal though another simulated 640 feet of altitude/delay, so that the optical signal passes through a total of 880 feet of altitude/delay.

After being delayed, the optical signal is converted by the photodiode 290 back into an RF signal. The resulting RF signal is passed through the second stage level control 190 in the RF delay module 150. The signal is then output through the antenna output 108 to the altimeter 10 to determine whether the altimeter 10 measures 880 feet.

Although the optical delay module 210 is described with respect to providing a delay of 880 feet, it will be appreciated that the optical delay module 210 can provide any delay between 80 feet and 10,160 feet. It will also be appreciated that for some predetermined altitudes, both the RF delay module 150 and the optical delay module 210 may be utilized to delay the signal 18. For example, to accommodate a delay for testing 910 feet of predetermined altitude, the first fiber optic coil 220 (simulating 80 feet), the second fiber optic coil 222 (simulating 160 feet), and the fourth fiber optic coil 226 (simulating 640 feet) are used with the first coaxial coil 154 (simulating 10 feet) and the second coaxial coil 156 (simulating 20 feet).

Figure 3:
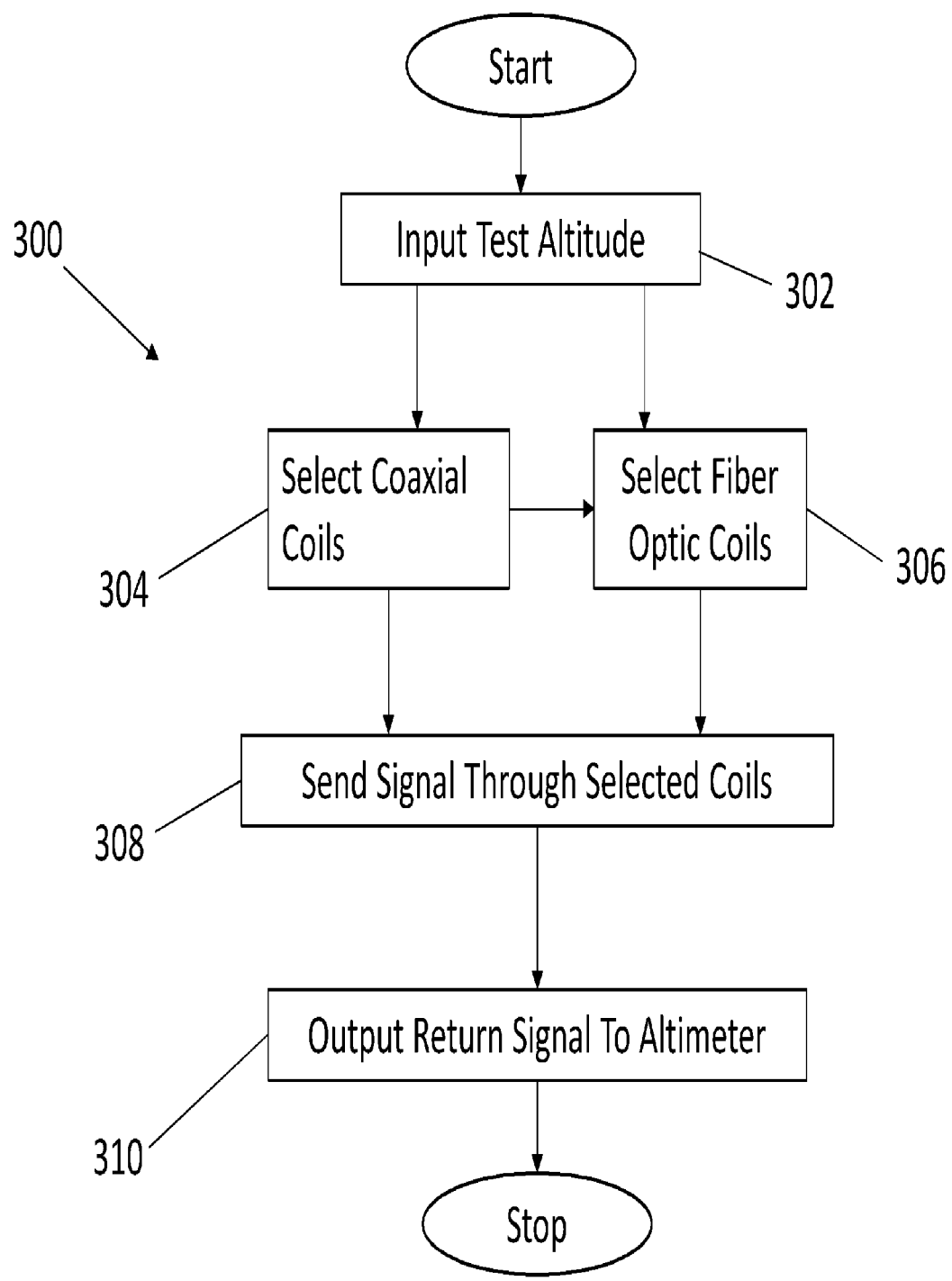
FIG. 3 is a flowchart of an example method of operating the altimeter testing device shown in FIG. 2 in accordance with the disclosed principles to test an altimeter such as e.g., the altimeter shown in FIG. 1.

Referring now to FIG. 3, an example of a test method 300 that may be performed by the testing device 100 is now described. In particular, the test device 100 may use method 300 to test the accuracy of an altimeter, which is described as being performed for altimeter 10 of FIG. 1. In one embodiment, the method 300 is performed by the controller 128 of the test device 100. To perform the method 300, the altimeter's antenna 16 is coupled to the input 106 of test device 100 and the altimeter's antenna 24 is coupled to the output 108 of test device 100.

At block 302, the controller 128 inputs a test altitude. In the illustrated embodiment, an operator selects the predetermined test altitude by inputting a test altitude into the touchscreen display 132. The test altitude may be selected in increments of 10 feet, from 10 feet up to 10,230 feet. The controller 128 then determines which coaxial coils 152 and/or fiber optic cables 212 are required to delay the altimeter's transmitted signal 18 for the predetermined altitude. For example, if a delay of 10 feet, 20 feet, and/or 40 feet is required to add up to the predetermined altitude, controller 128 selects the necessary coaxial coils 152 at block 304. If a delay of 80 feet, 160 feet, 320 feet, 640 feet, 1280 feet, 2560 feet, and/or 5120 feet is required to add up to the predetermined altitude, the controller 128 selects the necessary fiber optic coils 212 at block 306. In some embodiments, the controller 128 may only select coaxial coils 512 (at block 304) based on the input test altitude. In some embodiments, the controller 128 may only select fiber optical coils 212 (at block 306) based on the input test altitude. In some embodiments, the controller 128 may selects both coaxial coils 512 (at block 304) and fiber optic coils 212 (at block 306).

At block 308, the RF signal received from the altimeter 10 is sent through the selected coaxial coils 152 and/or fiber optic coils 212 of the testing device 100 (as described in detail above with respect to FIG. 2). The selected coaxial coils 152 and/or fiber optic coils 212 delay the signal for a time that corresponds to the natural delay for the predetermined altitude. During the testing, various components in the testing device 100 (e.g., first stage level control 170 and second stage level control 190) may alter the signal to account for natural amounts of noise and feedback. At step 310, a return signal 22 is sent to the altimeter 10 after the input signal 18 is delayed based on the input test altitude and in accordance with the disclosed principles.

The altimeter 10 may then measure the delay time of the return signal 22 it receives and may indicate a measured signal distance. The operator may then compare the measured distance to the predetermined altitude to determine whether the altimeter 10 is accurately measuring altitude.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

The invention claimed is:

1. A method of testing an altimeter, the method comprising:
   receiving a radio-frequency (RF) signal from the altimeter;
   passing the received RF signal through at least one delay module to delay the RF signal by a delay corresponding to a test altitude comprising a first altitude and a second altitude larger than the first altitude, wherein the delay comprises an RF delay that corresponds to the first altitude and an optical delay that corresponds to the second altitude; and
   transmitting the delayed RF signal to the altimeter.

2. The method of claim 1, further comprising:
   passing the received RF signal through an RF delay module to delay the RF signal by the RF delay;
   converting the RF signal delayed by the RF delay to an optical signal;
   passing the optical signal through an optical delay module to delay the optical signal by the optical delay; and converting the optical signal delayed by the optical delay to a return RF signal to generate the delayed RF signal sent to the altimeter.

3. The method of claim 2, wherein passing the received RF signal through the RF delay module comprises passing the received RF signal through one or more of a plurality of coaxial cable coils of the RF delay module.

4. The method of claim 3, wherein a length of each of the plurality of coaxial cable coils correlates to a respective predetermined RF delay for the RF signal.

5. The method of claim 2, wherein passing the optical signal through the optical delay module comprises passing the optical signal through one or more of a plurality of fiber optic cable coils.

6. The method of claim 5, wherein each of the plurality of fiber optic cable coils includes a different length of fiber optic cable and a length of each of the plurality of fiber optic cable coils correlates to a respective predetermined optical delay for the optical signal.

7. The method of claim 2, wherein passing the RF signal through the RF delay module comprises attenuating the RF signal.

8. The method of claim 1, further comprising passing the received RF signal through at least one component that correlates to path loss of the received RF signal at the test altitude.

9. The method of claim 1, being performed by an altimeter testing device.

10. The method of claim 9, further comprising receiving the test altitude at an interface of the altimeter testing device.

11. A device for testing an altimeter, comprising:
an input to receive a radio-frequency (RF) signal from the altimeter;
at least one delay module to delay the RF signal by a delay corresponding to a test altitude comprising a first altitude and a second altitude larger than the first altitude, wherein the delay comprises an RF delay that corresponds to the first altitude and an optical delay that corresponds to the second altitude; and
an output for transmitting the delayed RF signal to the altimeter.

12. The device of claim 11, wherein the at least one delay module comprises:
an RF delay module to delay the received RF signal by the RF delay;
a first signal converter to convert the RF signal delayed by the RF delay to an optical signal;
an optical delay module to delay the optical signal by the optical delay; and
a second signal converter to convert the optical signal delayed by the optical delay to a return RF signal to generate the delayed RF signal sent to the altimeter.

13. The device of claim 12, wherein the RF delay module comprises:
a plurality of coaxial cable coils, each including a different length of coaxial cable; and
a plurality of RF switches coupled across the coaxial cables and each being operable to selectively couple a corresponding one of the plurality of coaxial cable coils to a signal path of the received RF signal through the RF delay module.

14. The device of claim 13, wherein the length of each of the plurality of coaxial cable coils correlates to a respective predetermined RF delay in the RF signal.

15. The device of claim 13, wherein:
a first coaxial cable of the plurality of coaxial cable coils has a length that correlates to an altitude of 10 feet,
a second coaxial cable of the plurality of coaxial cable coils has a length that correlates to an altitude of 20 feet, and
a third coaxial cable of the plurality of coaxial cable coils has a length that correlates to an altitude of 40 feet.

16. The device of claim 12, wherein the optical delay module comprises:
a plurality of fiber optic cable coils, each including a different length of optical fiber; and
a plurality of optical switches coupled across the fiber optic cable coils and each being operable to selectively couple a corresponding one of the plurality of fiber optic cable coils to a signal path of the optical signal through the optical delay module.

17. The device of claim 16, wherein the length of each of the plurality of fiber optic cable coils correlates to a respective optical delay in the optical signal.

18. The device of claim 16, wherein:
a first fiber optic cable of the plurality of fiber optic cable coils has a length that correlates to an altitude of 80 feet,
a second fiber optic cable of the plurality of fiber optic cable coils has a length that correlates to an altitude of 160 feet,
a third fiber optic cable of the plurality of fiber optic cable coils has a length that correlates to an altitude of 320 feet,
a fourth fiber optic cable of the plurality of fiber optic cable coils has a length that correlates to an altitude of 640 feet,
a fifth fiber optic cable of the plurality of fiber optic cable coils has a length that correlates to an altitude of 1280 feet,
a sixth fiber optic cable of the plurality of fiber optic cable coils has a length that correlates to an altitude of 2560 feet, and
a seventh fiber optic cable of the plurality of fiber optic cable coils has a length that correlates to an altitude of 5120 feet.

19. The device of claim 11, wherein the delay module includes a digital attenuator to attenuate the RF signal.

20. The device of claim 11, further comprising at least one component that correlates to path loss of the received RF signal at the test altitude.

* * * * *